INVENTOR.
LEONARD M. GREENE

INVENTOR.
LEONARD M. GREENE
BY
ATTORNEYS

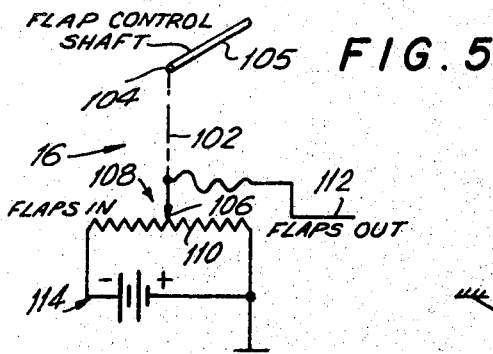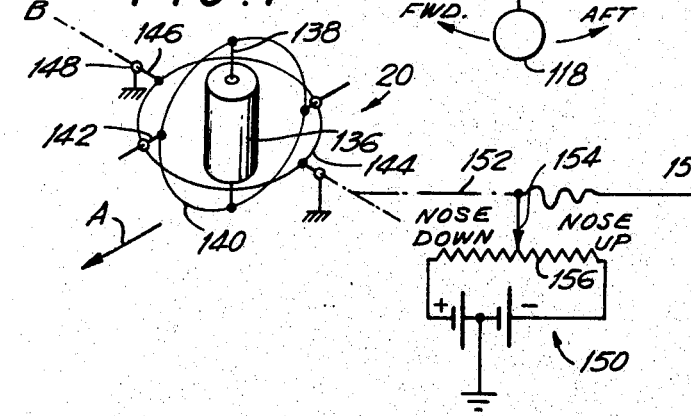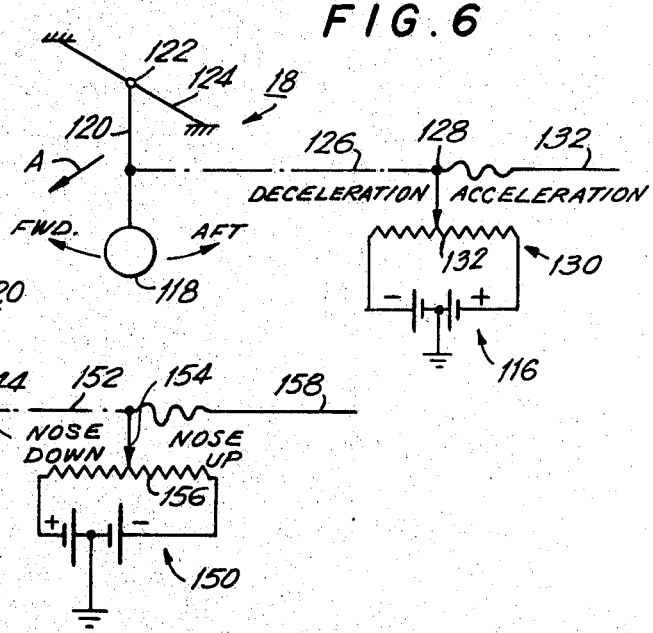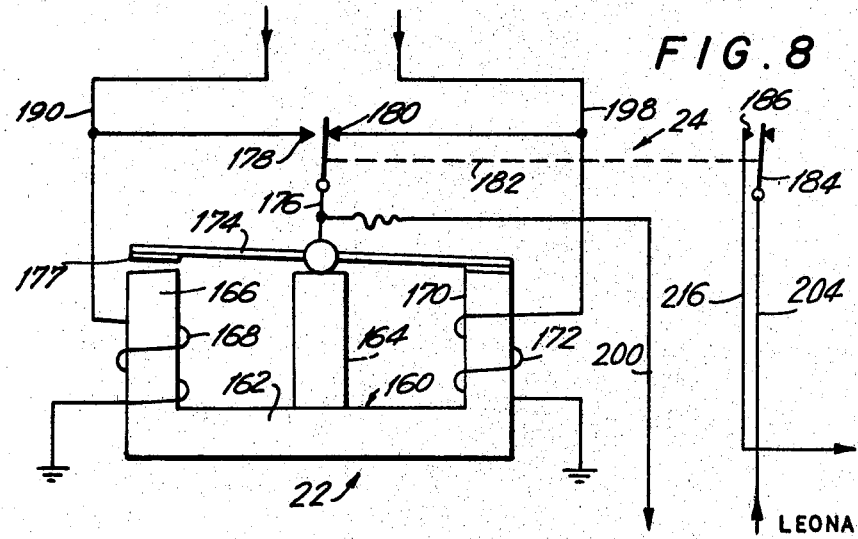

United States Patent Office 3,486,722
Patented Dec. 30, 1969

3,486,722
AIRPLANE INSTRUMENTS
Leonard M. Greene, Chappaqua, N.Y., assignor to Safe
Flight Instrument Corp., White Plains, N.Y., a corporation of New York
Filed Nov. 14, 1967, Ser. No. 682,913
Int. Cl. B64d 31/06
U.S. Cl. 244—77                                    10 Claims

ABSTRACT OF THE DISCLOSURE

An airplane instrument which automatically controls an engine throttle, or supplies an indication for control thereof, as a function of the combination of two signals. One signal is that of acceleration independent of the pitch attitude of the airplane and the other signal is the highest of two alternate signals, the first alternate signal being the airspeed of the airplane and the second alternate signal being the lift of the airplane. Both the first and the second alternate signals are deviation signals representing the difference in the first instance between the actual airspeed and a pilot preselected airspeed and in the second instance between the actual lift and a pilot unalterable preselected lift that takes flap position into account. The selection between the two alternate signals is performed auomatically and not under a pilot's control.

BACKGROUND OF THE INVENTION

Field of the invention

Automatic throttle control of an airplane by an integrated lift/airspeed computer.

Description of the prior art

The present invention is concerned with indicating or automatically controlling the throttle setting, hereinafter referred to as "throttle," of an airplane at all times except during take-off, the system not being used at this time because at take-off it is the practice to set the throttle at maximum power.

It has been proposed heretofore to control the throttle of an airplane in response to airspeed, the term "throttle" being understood to be a thrust control. For example, an airplane would be provided with an airspeed instrument having a manually settable pointer, sometimes referred to as a "bug," movable around the indicated airspeed scale of the instrument. The instrument would also have an indicated airspeed pointer and an output. The output was of the null type, that is to say, an output which provided an error or deviation signal which was a function of the difference between indicated airspeed and the preselected airspeed corresponding to the bug position. This airspeed error signal would be fed to the throttle, increasing the throttle setting if the airspeed error was on the negative side denoting too slow a speed, and decreasing the throttle setting so as to decrease engine thrust if the airspeed error signal was on the positive side denoting an indicated airspeed greater than the preselected airspeed.

This airspeed throttle control system was subject to certain disadvantages. For example, when the airplane was under such automatic control there was a tendency under some conditions to incur too wide an amplitude of airspeed excursion. Automatic throttle control also was subject to a pilot manual error in setting the bug. The pilot might think he was setting the bug at an airspeed which was a proper speed for a particular set of conditions and he might actually set the airspeed at a speed other than that at which he intended, for instance, ten knots lower. This then would mean that the airplane would automatically fly at the lower speed which might be too slow for safety. Another difficulty with the airspeed automatic throttle control system was that there might be a mental error on the part of the pilot which would, for instance, constitute a mistake in computing, that is to say, in a calculating, of the proper airspeed for a given set of conditions. This, too, could result in a possibly dangerously low airspeed and improper operation of the airplane. Still a further disadvantage of an airspeed automatic throttle control was that the airplane might be flown in some unexpected maneuver. For instance, the pilot might take a turn and forget to reset the airspeed bug for proper turning speed or the pilot might have to make a sudden swerving maneuver to avoid collision and he would have no time to reset the airspeed bug to take this maneuver into account. This would mean that during the sudden maneuver, although the set airspeed might be proper for the airspeed preceding the maneuver, it would be improper for the airplane parameters during the maneuver; an airspeed which could be perfectly safe in unaccelerated flight could be quite dangerous during a sharp turn. Still a further disadvantage of employing airspeed automatic throttle control was that no allowance was made for unexpected turbulence. A sudden tail gust or a sudden lateral gust or a sudden encounter of a downdraft or wind shear could render any given pilot's selected airspeed unsafe. This condition, likewise, caused an appreciable amplitude in airspeed excursion when the airplane was under airspeed throttle control.

All in all, as will be appreciated from the foregoing, an airspeed automatic throttle control system had no way of knowing what a proper airspeed was at a given time. Such a system was only as good as the airspeed that was set into it and the correct airspeed under various conditions could fluctuate substantially and quickly.

It also has been proposed to employ a system in which an indication for pilot manual throttle control or an automatic throttle control was regulated by the lift of an airplane. Actually, the lift figure employed was the lift ratio which is a fraction of which the numerator is the prevailing lift and the denominator is the maximum lift available, that is to say, the total lift that would be available if the attitude of the airplane were changed to a point just approaching the stall. This lift of the airplane is measured in various conventional manners, such, for instance, as lift coefficient or angle of attack. The lift coefficient can be measured by a means that is responsive to the position of the shifting stagnation point on a nose of an airplane or by a means that is responsive to the variation of pressure on any part of the wing of an airplane, preferably adjacent the nose of the airplane, where the change in pressure with change in angle of attack is the greatest. The angle of attack which can be measured with my invention can be taken from an angle of attack vane. As hereinafter used, the term "lift" embraces lift coefficient, lift ratio, and angle of attack, these all being equivalent to one another for the purposes of my present invention. In systems in which lift was used for the control of an airplane throttle, a null arrangement was likewise employed. A certain preselected value of lift for a specific maneuver or for a flight condition was selected. The selected lift was a preselected amount less than stall. Then, if the lift error signal indicated that the lift was too high, it was an indication that the airplane was approaching an unsafe condition and therefore the throttle should be advanced. Advancing the throttle would reduce the lift error signal toward the null signal. On the other hand, if the lift error signal was too low, the throttle setting was reduced, whereby to return the lift error signal toward null by increasing lift.

This second system likewise had its disadvantages. It tended to command airspeed excursions at a higher frequency than the airspeed throttle system, the excursions being of an appreciable amplitude. Nor was it sufficiently versatile. With it the pilot was unable to set the airspeed of an airplane at some desired value. For instance, the airspeed could not thereby be held closely at low angles of attack, such, for instance, as at the higher speed that prevailed when the airplane was flying a holding pattern.

With both airspeed and lift type systems it has been proposed heretofore to modify the signal fed to the indicator or to the automatic throttle control to take into account forward acceleration independent of pitch attitude. An instrument embodying this refinement is shown in my United States Letters Patent No. 3,043,540. This patent describes the addition of forward acceleration independent of pitch attitude to a lift signal in order to anticipate a change in lift which will prevail in the immediate future. Similarly, in another of my United States Letters Patent No. 3,285,067, I have shown such a signal, to wit, forward acceleration independent of pitch attitude, combined with an airspeed signal to indicate the desired control or to automatically control the throttle of an airplane. However, despite such addition of the anticipated change in lift or airspeed to the prevailing lift or airspeed for throttle control, the systems still were subject to the same disadvantages as those pointed out above with respect to simple lift and airspeed throttle control systems.

SUMMARY OF THE INVENTION

It is an object of my present invention to provide an improved airplane instrument which is not subject to any of the foregoing defects.

I have discovered that it is possible to reduce the amplitude of airspeed excursions while increasing the frequency of excursions so as to provide smoother and more stable flight.

Moreover, it is desirable that the automatic throttle control not command an unsafe airspeed. As observed previously, since the preselected control airspeed is determined and set by the pilot, there is always the possibility of manual or mental error. In order to maintain a safe margin above stall, just setting an airspeed which apparently is safe is not enough, even if it were truly safe at unaccelerated flight. There are many sets of conditions, for example, that of a steep turn, where a set airspeed may be too slow. However, pursuant to my present invention, I employ a "minimum airspeed for the situation" back-up. That is to say, pursuant to my present invention I establish a precalibrated non-pilot-adjustable lift-oriented speed floor, whereby the throttles cannot command an unsafe low airspeed. The only setting which the pilot can make is that of a preselected or null airspeed. My instrument has built into it a lift-oriented parameter which the pilot cannot get at and which effectively sets a floor below which the throttles cannot command an airspeed that would be unsafe for any situation. With my new instrument a reduction in engine thrust would not be commanded merely upon the origination of such a command when the airspeed fell off or when there was a decrease in lift; but such a command can only take place upon the happening of both such events.

Also, for navigational reasons, the pilot should have the flexibility of choosing a control, i.e., preselected, airspeed, particularly in the flight realms prior to final approach. Pursuant to my present novel system the pilot can do this by manually setting the control reference preselected airspeed indicator, i.e., bug, on the airspeed instrument. This is now a safe action because the lift sensing means will not permit the throttles to command an airspeed which is below the preselected lift at any time under prevailing conditions, so that the airplane will fly a safe margin above stall in case of errors in setting, unexpected maneuvers or unexpected turbulence. Hence, with my instrument although airspeed generally may prevail, there is always a watchful eye (monitor) which does not allow airspeed to place the airplane in an unsafe flight condition, the watchful eye being the lift control.

Likewise, as indicated previously, at higher speeds and corresponding lower angles of attack, the lift, which includes angle of attack, speed reference is not sufficiently accurate to hold a constant speed. The reason is that at high speeds a small change in speed requires only a very small change in angle of attack to maintain constant lift. However, as is well recognized for navigational or other reasons, it may be desirable to maintain a constant speed. Hence, it is important to be able to control the throttle from an airspeed reference, since from the consideration solely of airspeed under ordinary flight conditions, a lift reference is not sufficiently accurate.

It is an object of my invention to provide an instrument for automatically controlling the throttle of an airplane, or for indicating said control, in such a manner that pilot induced errors and lift requirements cannot force the aircraft to fly at an unsafe margin above stall. In general, pursuant to my invention, the airspeed signal, specifically an error signal, is used to maintain a constant preselected speed in stable flight, whereas the lift signal will monitor, and if necessary, intermittently control, during dynamic maneuvers and in the event of errors in pilot setting of the bug.

Specifically, it is an object of my invention to provide an airplane instrument wherein there is a throttle control either for an indicator or for automatic operation, which control is automatically under the regulation of the higher speed command of two prevailing conditions, one of which is the airspeed and the other of which is the lift, that is to say, a system in which there is an automatic selection between airspeed and lift, the selection always being on the side of the highest commanded airspeed.

It is another object of my invention to provide an airplane instrument of the character described wherein the automatic selection is made between an airspeed error signal which is nulled to a pilot settable airspeed and a lift signal which is nulled to a non-pilot-set lift, so that the pilot is unable to influence the signal which provides the safe back-up flight control.

It is another object of my invention to provide an instrument of the character aforesaid which further includes otherwise conventional refinements, such, for instance, as the influence of the flap position, the forward acceleration independent of pitch attitude, and the pitch rate.

It is a principal object of my invention to provide an instrument of the character described in which the selection between the airspeed signal and the lift signal can fluctuate rapidly between whichever signal momentarily commands the higher engine thrust. Thereby, when the signal in command experiences a reduction which would result in a lowering of airspeed, such reduction will only proceed for a limited time when the command will be assumed by the other signal if such other signal fails to call for such reduction. Hence, instead of the airplane being subjected to a wide amplitude of change of airspeed, the amplitude will be reduced by the change in command which prevents too far a fall off in airspeed. Thereby, the airplane will fly at a slightly increased average, more even air speed if the excursions in command of the airspeed and lift are fluctuating rapidly, e.g., during turbulence, which is a desirable thing.

Other objects of my invention in part will be obvious and in part will be pointed out hereinafter.

My invention accordingly consists in the features of construction, combinations of elements and arrangements of parts which will be exemplified in the instrument hereinafter described.

BRIEF DESCRIPTION OF THE DRAWINGS

In the accompanying drawings, in which is shown one of the various possible embodiments of my invention.

FIG. 5 is a schematic view of the flap position instrument and its transducer;

FIG. 6 is a schematic view of the pendulous accelerometer and its transducer;

FIG. 7 is a schematic view of the vertical gyro and its transducer; and

FIG. 8 is a schematic view of the comparator and selector means with its associated selector switch.

DESCRIPTION OF THE PREFERRED EMBODIMENT

Figure 1:
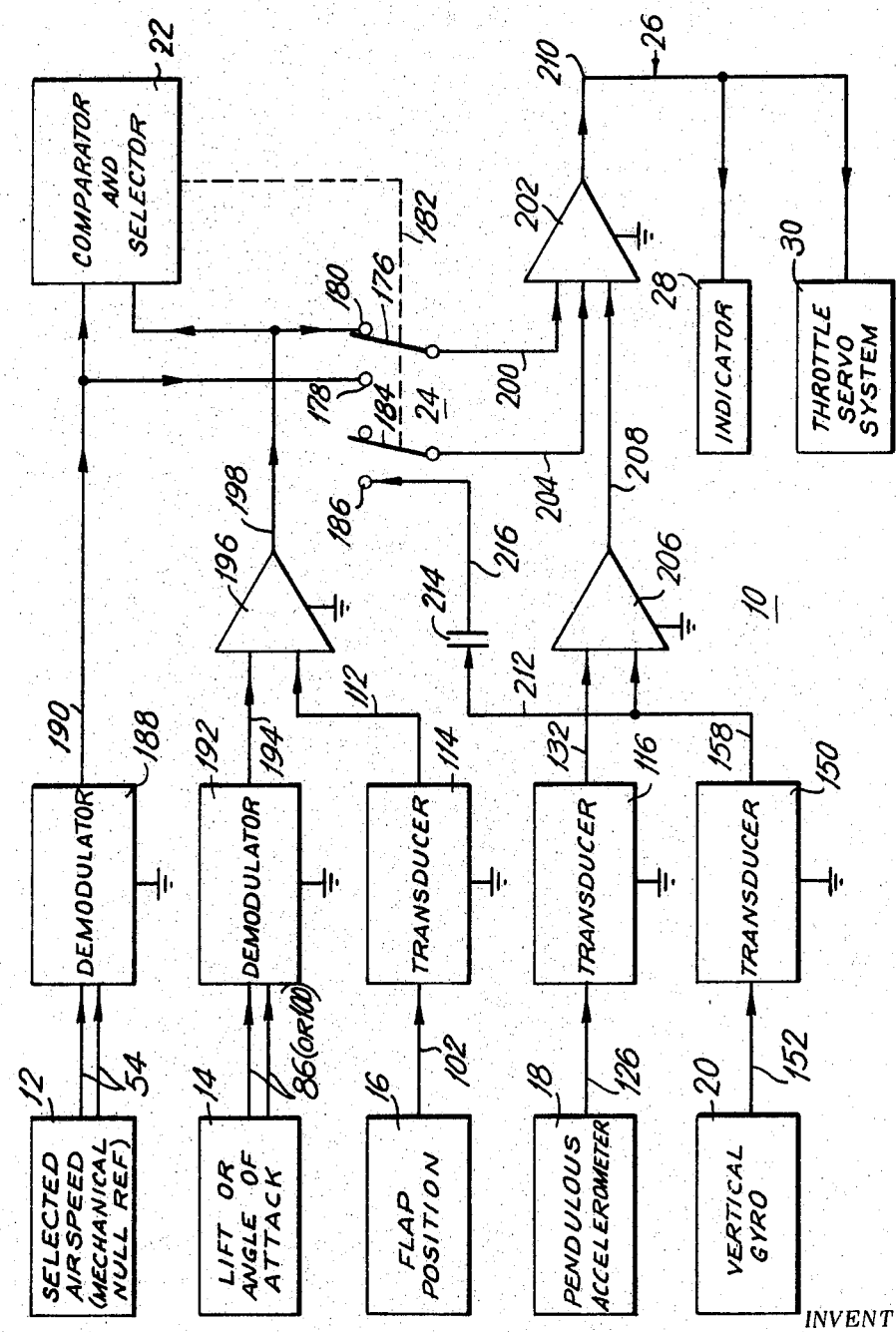
FIG. 1 is a schematic and circuit diagram of an airplane instrument embodying my invention.

In general, I achieve the several objects of my invention by providing an airplane instrument which (a) supplies two signals, preferably error signals, one of which is an airspeed error signal and the other of which is a lift error signal; (b) constantly compares these two signals; (c) selects between these two signals on an instantaneous continuous basis that signal which commands the highest airspeed, in other words, constantly monitors the two signals and by shifting between the two signals always selects that signal which would yield the highest airspeed; and (d) employs the selected signal to control the throttle setting. In its preferred form, the airplane instrument also includes refinements which, per se, are known in other throttle control systems, such, for instance, as flap position signal to modify the lift signal or serve as a null reference therefor, a signal of forward acceleration independent of pitch attitude to modify whichever of the airspeed error signal or lift error signal that momentarily prevails (is chosen by the automatic selecting means), and a pitch rate signal to modify the airspeed error signal if said airspeed error signal prevails, such pitch rate signal being employed because airspeed changes in response to change in engine thrust are somewhat sluggish.

Conventional means are employed for all of the signal sources, my invention residing in the unique combination of these means as described above. Thus, the airspeed can be measured by a conventional dynamic indicator airspeed sensing means, this airspeed sensing means being a means which senses the forward dynamic pressure of an airplane, as by sensing the total pitot pressure in a forward direction and subtracting the prevailing static pressure. The lift can be measured by a sensing element which is responsive to a lift value of the airplane such as lift ratio. Such a means can be a means for measuring the change in the position of the shifting stagnation point on the nose of an airplane wing. The lift also can be measured by simply measuring the angle of attack. In my aforesaid United States Letters Patent No. 3,043,540, I have shown suitable means for measuring indicated airspeed, means for measuring lift ratio and means for measuring angle of attack. These or other well known means can be employed in the present invention. It should be observed that a means for measuring indicated airspeed also includes, in the preferred form of the present invention, a means for pilot setting of a preselected value of airspeed which is employed as a null against which the actual indicated airspeed is compared to yield an indicated airspeed error signal.

The aforesaid patent likewise includes a means for furnishing a signal which is a function of forward acceleration independent of pitch attitude. In my United States Letters Patent No. 2,945,375 I show a means for furnishing a signal which is indicative of flap position. Likewise, in my aforesaid Patent No. 3,043,540 I have shown a pendulous accelerometer and vertical gyro that I use in combination to provide the signal of forward acceleration independent of pitch attitude, the vertical gyro also being useful to furnish a pitch rate signal.

Referring now in detail to the drawings, the reference numeral 10 denotes an airplane instrument constructed in accordance with the present invention.

The instrument generally includes a null type airspeed indicating means 12, a lift or angle of attack indicating means 14, a flap position sensing means 16, a pendulous accelerometer 18, a vertical gyro 20, and sundry transducers and demodulators which will be hereinafter described in detail, a comparator and selector means 22, a selector switch 24, sundry mixer amplifiers which will be hereinafter described in detail, and an output 26 which feeds to an integration mechanism such as an indicator 28 and/or a throttle servo system 30.

The various means will be described in detail in order to provide an example of a complete instrument embodying my invention. However, it is to be understood that my invention is not to be limited to such specific details or to the specific means described, inasmuch as such means, and the various transducers and demodulators may take various forms without departing from the spirit of my invention. For convenience, the various means and their connections have been indicated schematically in the function block circuit diagram of FIG. 1, but the specific detailing of the means is shown in FIGS. 2–8.

Figure 2:
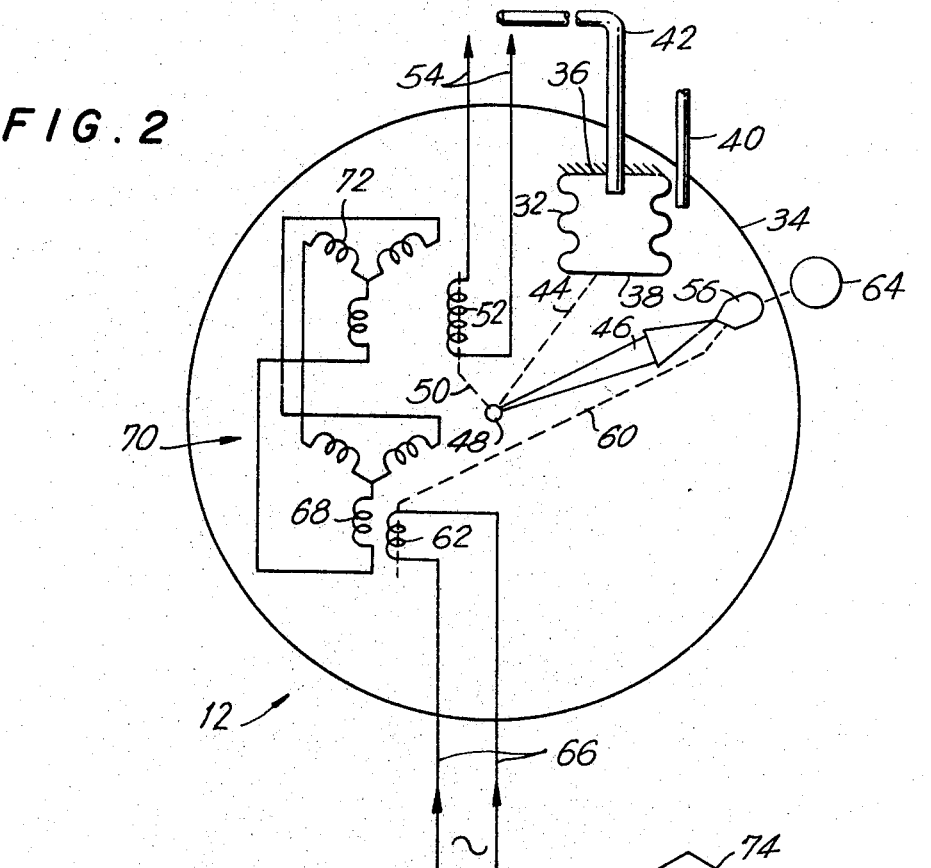
FIG. 2 is a schematic view of the selected airspeed instrument with a null reference.

Referring now to such FIGS. 2–8, and in particular to FIG. 2, the null type airspeed indicating means 12 comprises a bellows 32 housed in an airtight casing 34. One wall 36 of the bellows is fixed and the other wall 38 is shiftable as a function of the difference in pressures between the interior of the bellows and the interior of the casing. A tube 40 connects the interior of the casing to static pressure, i.e., the pressure of the atmosphere in which the airplane is operating. Another tube 42 extends from the interior of the bellows through the stationary wall 36 thereof, to which it is tightly sealed, to a forwardly facing pitot tube external to the airplane and sufficiently far from the airplane wing, propellers, jet engines and fuselage structure to be materially unaffected by turbulence created by the airplane. Thereby, the air pressure within the bellows is a total pitot pressure including the static pressure that is a function of altitude and air conditions plus the dynamic pressure that is a function of indicated airspeed. Hence, the wall 38 of the bellows will experience movement which is a function of dynamic air pressure and therefore a function of indicated airspeed. The wall 38 of the bellows is connected by a linkage 44 to an airspeed read-out pointer 46 which reads against the indicated airspeed scale (not shown) of the null type airspeed indicating means 12. The pointer 46 turns about a center 48 and is connected by a further linkage 50 to a pick-off coil 52. Hence, the position of the pick-off coil is a function of indicated airspeed.

The pick-off coil has a pair of output leads 54 (see also FIG. 1) on which there appears an output signal that is a function of airspeed error, i.e., a signal which is a function of the difference between indicated airspeed and a pilot preselected airspeed. As soon will be appreciated, the airspeed error signal appearing on the leads 54 is an AC signal which is polarized by phase reversal and the amplitude of which is a function of the degree of error. The phase reverses as the error moves through zero (which is at the pilot preselected airspeed) so that one phase prevails when the indicated airspeed is above the pilot preselected airspeed and the reverse phase prevails when the indicated airspeed is less than the preselected airspeed.

In order to set in the pilot controlled preselected airspeed, the means 12 conventionally includes a pilot settable element 56 commonly known as a "bug." The bug is connected by a mechanical linkage 60 to an input coil 62. A knob 64 is included for convenience in setting the bug airspeed. Input leads 66 supply AC to the input coil 62. The coil 62 is mounted to turn in electromagnetically coupled proximity to the input delta-connected windings 68 of a control transformer 70. Said windings 68 are connected to delta-connected output windings 72 adjacent which the pick-off coil 52 turns in electromagnetically coupled relationship. Thus, power will be transmitted from the input coil 62 to the pick-off coil 52. The power voltage generated in the pick-off coil will be a function both of indicated airspeed due to change in angular position of the coil 52 upon change in indicated airspeed of the bug setting, and preselected airspeed due to change in angular position of the input coil 62 experienced upon change in position of the bug. The means 12 is so arranged that when the indicated airspeed is the same as the airspeed for which the bug has been set by the pilot, there will be a zero output appearing on the leads 54, and when the indicated airspeed is either above or below the pilot selected airspeed, the amplitude of the AC signal appearing on the leads 54 will be a function of the amount of difference and the phase of the AC signal will depend upon whether the indicated airspeed is greater or less than the pilot selected airspeed.

Figure 3:
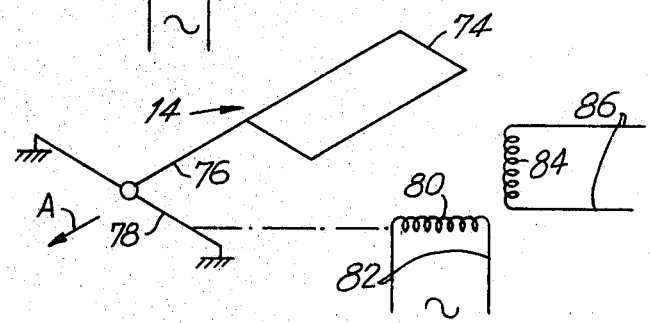
FIG. 3 is a schematic view of the angle of attack instrument.

Referring to FIG. 3, I have there shown one specific type of lift indicating, i.e., sensing, means which specifically is responsive to angle of attack. Said means includes an angle of attack vane 74 fixed to an arm 76 that turns about a lateral shaft 78, i.e., a shaft supported to turn with respect to the fuselage about an axis perpendicular to the line of flight A of the airplane, and horizontal when the airplane is horizontal. The shaft 78 is connected to control the angular orientation of an input coil 80 having input leads 82 which supply AC thereto. The coil 80 is mounted to turn in electromagnetically coupled relationship with an output coil 84 having output leads 86, whereby the voltage appearing on the output leads is alternating and the amplitude thereof varies as a function of the angle of attack of the airplane. These output leads 86 also appear in the function block diagram of FIG. 1. If desired, the output from the angle of attack sensing means 14 may be of the null type, i.e., a function of the deviation of the angle of attack from a selected (but not pilot settable) angle of attack which represents an angle of attack that is a safe minimum in excess of stall. However, in the instrument 10 illustrated, no such null is provided in said means 14. Instead, as shortly will be apparent, a null reference signal is provided from the flap position sensing means 16, or more particularly, from the transducer 114 for the flap position sensing means 16.

Figure 4:
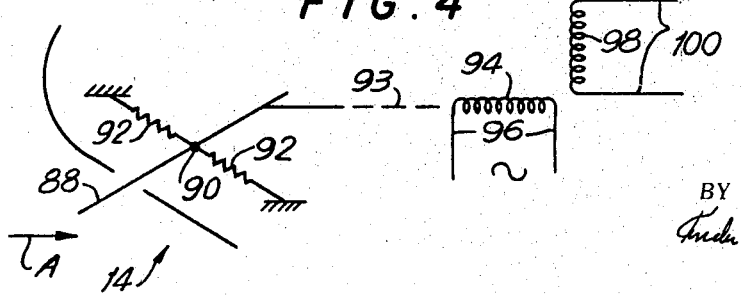
FIG. 4 is a schematic view of the lift ratio instrument.

The lift sensing means 14 alternately may be a lift ratio sensing means, such as shown in FIG. 4 where the same constitutes a vane 88 mounted to turn on a horizontal (when the aircraft is horizontal) transverse shaft 90 within the airplane wing in back of the skin covering the nose of the wing. The vane extends through an opening in the nose of the wing, so that the tip of the vane protrudes forwardly from the wing in the vicinity of the region of the shifting stagnation point. The vane is urged to a neutral position by counterbalancing springs 92. The vane is connected by a mechanical linkage 93 to an input coil 94 that is supplied with AC by input leads 96. The input coil is located in electromagnetically coupled relationship with a stationary output coil 98 having output leads 100, whereby the amplitude of the AC signal appearing on the output leads 100 is a function of the lift ratio. The leads 100 may be substituted for the leads 86 in FIG. 1. In other words, one or the other of the lift ratio sensing means (FIG. 4) or the angle of attack sensing means (FIG. 3) is employed, but not both.

The flap position sensing means 16 is schematically indicated in FIG. 5 and constitutes a linkage 102 connected to the shaft 104 of a flap control arm 105. The linkage 102 controls the position of the movable tap 106 of a potentiometer 108, the resistance winding 110 of which is connected across a DC source of potential such as a battery. An output lead 112 runs from the tap 106, the positive terminal of the battery being grounded. The potentiometer 108 constitutes a mechanical-to-electrical transducer 114 (see FIG. 1) for the flap position sensing means 16.

Referring now to FIG. 6, I have there schematically illustrated a pendulous accelerometer 18 and its mechanical-to-electrical transducer 116. The pendulous accelerometer constitutes a pendulum bob 118 secured to an arm 120 that is journalled at 122 to a shaft 124 which is fast on the airplane frame. Said shaft and journal are so disposed that the pendulum bob swings about a lateral axis which is perpendicular to the line of flight A and horizontal when the airplane is horizontal. The angular position of the pendulum bob with respect to the airplane frame varies as a function of forward inertial acceleration and pitch angle. The arm 120 is connected by a mechanical linkage 126 to the movable contact 128 of a potentiometer 130 that constitutes the transducer 116. Said potentimoeter has a resistance winding 132 over which the tap slides. The resistance winding is connected across a source of DC such as a battery, the midpoint of which is grounded. An output lead 134 is connected to the tap and provides a polarized DC signal which is a function or forward acceleration plus pitch.

The vertical gyro 20 is schematically illustrated in FIG. 7. It includes a spinning weight 136 secured to a vertical weight shaft 138. The ends of the weight shaft are journalled in bearings in a vertical gimbal ring 140 that lies in a vertical plane parallel to the fore and aft axis of the airplane and generally parallel to the line of flight A. The gimbal ring 140 is provided with trunnions 142 journalled to turn on a roll axis parallel to the line of flight A in bearings carried by a horizontal pitch gimbal ring 144, the trunnions and bearings being located in a fore and aft line in the plane of the gimbal ring 140. The horizontal gimbal ring 140 is journalled by horizontal trunnions 146, that constitute the pitch axis B on a structural member of the airplane, for example, bearings 148, fixed to the airplane frame. The pitch axis B is at right angles to the line of flight A and to the roll axis.

The spinning weight 136 is rotated at high speed by any suitable means, for example, an air motor or an electric motor of conventional construction.

As is well known, in an arrangement of this character the horizontal gimbal ring 144 and the trunnions 146 constituting the pitch axis B will remain fixed within the airplane with said gimbal ring horizontal when the airplane experience pitch movement, i.e., changing its pitch angle. Thus, when the airplane rotates in space so as to raise or lower the angle of its nose, the horizontal gimbal ring 144 will not experience a corresponding angular movement about the pitch axis B, but will remain fixed in a plane parallel to the ground. Therefore, the angular relationship between the horizontal gimbal ring 44 and the frame of the airplane will vary as a function of the pitch angle of the airplane. This angular relationship is converted by a transducer 150 into a electrical output. Said transducer constitutes a mechanical linkage 152 from the trunnions 146 to a fixed tap 154 relative to which the resistance winding 156 of the poteniometer slides. The resistance winding is fixed to the frame of the airplane, so that as the airplane changes its pitch the winding will move with respect to the tap. The ends of the resistance winding are connected to a DC source of potential such as a battery, the midpoint of which is grounded. An output lead 158 is connected to the tap 154 and provides a polarized DC signal which is a function of pitch attitude.

It will be appreciated that if the signal output from the vertical gyro means 20 is subtracted from the signal output from the pendulous accelerometer, the signals being similarly scaled, the ensuing net signal will be a function of forward acceleration essentially independent of pitch attitude.

The comparator and selector means 22 is schematically illustrated in FIG. 8. As noted previously, it constitutes an arrangement for continually comparing the airspeed error signal and the lift error signal and continually selecting between these two signals on an instantaneous basis that signal which commands the highest airspeed. Said means 22 may be of a simple electromechanical form such as is illustrated herein, it being understood that said means may be so constructed as to be comprised partly or wholly of electronic components, preferably solid state components, so that there need be no moving parts as there are in the electromechanical means now to be described, whereby to obtain any desired degree of sensitivity and reliability and any desired speed of selection.

The means 22, as illustrated, includes a bistable polar relay 160 including a U-shaped laminated soft iron yoke 162 having a bar magnet 164 located with a pole thereof at the center of the base of the yoke. One leg 166 of the yoke has an airspeed error winding 168 thereon. The other leg 170 of the yoke has a lift error winding 172 encircling the same. A soft iron armature 174 is pivoted above the upper end of the bar magnet with its ends aligned with and near the tips of the arms 166, 170, the axis of rotation of the armature being so disposed that when one end of the armature abuts the end of its associated leg, the other end of the armature is slightly spaced from the end of its associated leg. Copper shims 177 are secured to the underside of the tips of the armature to prevent sticking.

The armature carries a movable contact blade 176 which is arranged to swing between a pair of stationary contacts 178, 180 forming part of the selector switch 24 controlled by the bistable polar relay. The blade 176 is connected by a mechanical linkage 182 to a movable contact blade 184 which moves into and out of engagement with a stationary contact 186. The blade 184 engages the contact 186 when the blade 176 engages the contact 178.

Turning now to the function block diagram of FIG. 1, the details of the various means having been explained, it there will be seen simply from inspection that the basic operation of the system is such that the comparator and selector means 22 continuously monitors the airspeed error signal and the lift error signal. It selects on a continual instantaneous basis between these two signals the signal which commands the highest airspeed. Then, through the selector switch 24, it makes this signal the command signal which operates a utilization mechanism. The selection is entirely automatic, that is to say, it is performed without intervention of the pilot and without the pilot being able to intervene. The function diagram also illustrates various refinements which are highly desirable in actual operation of my improved instrument.

Specifically, the null type airspeed indicating means 12 provides on its output leads 54 a polarized AC signal the amplitude of which is a function of the amplitude of the airspeed error and the polarity of which is a function of the direction of the error away from the pilot selected airspeed. This airspeed error is fed into a demodulator 188 having an output lead 190 on which there appears a DC airspeed signal the amplitude of which is a function of the size of the error, i.e., a function of the error in distance units per unit of time (e.g., knots per hour), and the polarity of which is a function of the direction of the error. The polarity of the airspeed error signal on the lead 190 is positive when the airspeed error is such that the indicated airspeed is too fast and negative when the error is such that the indicated airspeed is too slow, both of these being with relation to the preselected airspeed that has been set by the pilot with the aid of the bug. The lead 190 is connected to the contact 178 and to one terminal of the airspeed error winding 168, the other terminal of which is grounded. Hence, the leg 166 will exercise an attractive or repellant force on its associated end of the armature 174 which force is a function of the amplitude and polarity of the airspeed error signal appearing on the lead 190.

The lift or angle of attack indicating means 14 provides on its output leads 86 (or 100, as the case may be) an AC signal the amplitude of which is a function of the amplitude of lift. This lift signal is fed into a demodulator 192 having an output lead 194 on which there appears a DC signal the amplitude of which is a function of the amplitude of lift.

The transducer 114 for the flap position sensing means provides on its output lead 112 a DC signal which is employed as the null reference signal for lift. This signal likewise is fed into the mixer/amplifier 196. The latter has an output lead 198 on which the DC signal appearing is that of lift error. This now is a polarized DC signal the amplitude of which is a function of the amount of deviation between the prevailing lift and a preselected lift which has been calculated in advance to be a minimum safe lift below stall and which cannot be changed by the pilot, this minimum safe lift being set into the instrument by selecting the proper values for the resistance and DC supply on the transducer 114. The DC lift error signal is polarized so that it is positive for angles of attack less than the preselected null (also positive for lift ratio below the preselected null), and is negative for angles of attack and lift ratios above the preselected null. The airspeed error signal is approximately linear with respect to airspeed error and the lift error signal is approximately linear with respect to lift error. Moreover, the airspeed sensing means and the lift sensing means and their transducers and demodulators are so proportioned that the lift error signals and airspeed error signals are properly mutually scaled so that the signal voltage error gradients appearing on the leads 190 and 198 are approximately equal when the lift value is equivalent to the existing airspeed.

The lead 198 on which there appears the lift error signal is connected to the contact 180 and to one terminal of the lift error winding 172, the other end of which is grounded. The tip of the armature 174 associated with the leg 170 will be attracted or repelled in accordance with the amplitude and polarity of the signal appearing on the lead 198.

From the foregoing it will be apparent that the bistable polar relay continuously monitors the airspeed error and the lift error and compares the same through the yoke 162 and armature 174, so that the armature will swing to favor the signal which is most negative, this being in the airspeed error winding the slowest airspeed signal and for the lift error winding the largest angle of attack or lift signal. The armature controls the selector switch 24, the movable components of which are the blades 176 and 184, so that when the airspeed error signal prevails over the lift error signal, the selector switch 24 will swing the blade 176 into engagement with the contact 178, and when the lift error signal commands, it will swing the blade 176 into engagement with the contact 180. When the blade 176 engages the contact 178, the blade 184 will be swung into engagement with the contact 186. The blade 176 is connected by a lead 200 to a mixer/amplifier 202. Similarly, the blade 184 is connected by a lead 204 to the same amplifier. Hence, when the airspeed error commands the higher speed, the airspeed error signal from the lead 190 will be fed to the mixer/amplifier 202, and when the lift error commands the highest speed, the lead 198 will be connected to the mixer/amplifier 202.

Also fed to the mixer/amplifier 202 for reasons which are explained in detail in my United States Letters Patent No. 3,043,540, is a forward acceleration signal independent of pitch attitude. This signal is taken from a mixer/amplifier 206 via a lead 208. The mixer/amplifier 206 has fed into it signals appearing on the leads 132 and 158. The first signal is, as previously mentioned, a function of combined forward acceleration and pitch. The second signal is a function of pitch. In the mixer/amplifier 206 the second signal is subtracted from the first, so that the output appearing on the lead 208 is a function of forward acceleration independent of pitch attitude.

An output lead 210 leads from the mixer/amplifier 202. Appearing on this output lead is the command signal for a utilization mechanism such as either or both of the indicator 28 and the throttle servo system 30.

The acceleration signal combined with either the airspeed error signal or the lift error signal in the mixer/amplifier 202 adds a component which is a function of anticipated change in airspeed or lift. This refinement is fully explained in my aforesaid Patent No. 3,043,540 with respect to lift. The same refinement applies with respect to airspeed and will not be further explained, since it is not critical to the understanding of the basic principle of my invention.

The signal appearing on the lead 208 is positive for positive forward acceleration and is negative for negative forward acceleration, this being deceleration.

As is well known, it is desirable when airspeed error is employed to control throttle, for there also to be injected a signal which is a function of pitch rate because change in airspeed is somewhat sluggish, whereas change in pitch is more rapid. For this purpose I provide a lead 212 running from the lead 158 to a pitch rate capacitor 214 having an output lead 216 on which there appears a signal that is a function of pitch rate, i.e., change in pitch. This signal is negative when the nose of the airplane is raising and vice versa. Said signal on the lead 216 is fed to the contact 186 and is connected by the blade 184 and lead 204 to the mixer/amplifier 202 when the airspeed error signal is more negative than the lift error signal and is therefore commanding the highest airspeed and is being fed into the mixer/amplifier 202.

The command signal appearing on the lead 210 is positive to command a retarding action, i.e., slacking off of the throttle, and is negative to command an advance of the throttle.

It now will be apparent that when the pilot selected airspeed is set to command an airspeed which is slightly higher, e.g., three to fifteen knots, than the equivalent airspeed of the preselected lift, the lift error signal will exceed the airspeed error signal at any time that the airspeed error signal commands too great a reduction in engine thrust. Theerby, the amplitude of excursions in commanded engine thrust will be lessened and the frequency of the excursions will be increased, so that the flight of the airplane will be at a more even, slightly higher airspeed. This interaction between the two error signals may be viewed in another aspect. Consider each signal as plotted against time; then each instant that either signal penetrates the valley of the other signal the penetrating signal will assume command. Hence, it is necessary for both signals to fall off in order to direct a command to reduce the throttle.

It thus will be seen that I have provided an airplane instrument which achieves the various objects of my invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. An airplane instrument comprising means providing a first signal which is a function of airspeed, means providing a second signal which is a function of lift, means continuously comparing said signals, means operable responsive to said comparing means automatically to select whichever signal currently corresponds to the highest airspeed/lift condition, and a utilization mechanism connected by the selecting means to the chosen signal.

2. An airplane instrument comprising means providing a first signal which is a function of airspeed error constituting the difference between actual airspeed and a pilot preselected airspeed, means providing a second signal which is a function of lift error constituting the difference between actual lift and a non-pilot-preselected lift a safe margin above stall, means continuously comparing said signals, means operable responsive to said comparing means automatically to select whichever signal currently corresponds to the highest airspeed/lift condition, and a utilization mechanism connected by the selecting means to the chosen signal.

3. An airplane instrument as set forth in claim 2 wherein means is included to combine with the chosen signal prior to feeding same to the utilization mechanism a signal which is a function of forward acceleration in the absence of pitch attitude.

4. An airplane instrument as set forth in claim 3 wherein means further is included to combine with the chosen signal prior to feeding same to the utilization mechanism when the chosen signal is that of airspeed error a signal which is a function of pitch rate.

5. An airplane instrument as set forth in claim 2 wherein the second signal is a function of lift ratio error constituting the difference between actual lift ratio and a non-pilot-preselected lift ratio.

6. An airplane instrument as set forth in claim 2 wherein the second signal is a function of angle of attack error constituting the difference between actual angle of attack and a non-pilot-preselected angle of attack.

7. An airplane instrument as set forth in claim 2 wherein the second signal is also a function of flap position.

8. An airplane instrument as set forth in claim 1 wherein the utilization mechanism is a throttle regulating mechanism.

9. An airplane instrument as set forth in claim 8 wherein the throttle regulating mechanism is an indicator.

10. An airplane instrument as set forth in claim 8 wherein the throttle regulating mechanism is a throttle servo system.

References Cited

UNITED STATES PATENTS

| | | |
|---|---|---|
| 3,051,416 | 8/1962 | Rotier. |
| 3,043,540 | 7/1962 | Greene. |
| 3,095,169 | 6/1963 | Osder. |
| 3,143,319 | 8/1964 | Gorham et al. |
| 3,275,269 | 9/1966 | Yiotis. |
| 3,362,661 | 1/1968 | Boothe et al. |

MILTON BUCHLER, Primary Examiner

JEFFREY L. FOREMAN, Assistant Examiner

U.S. Cl. X.R.

340—27